United States Patent
Lee et al.

(10) Patent No.: US 7,194,897 B2
(45) Date of Patent: Mar. 27, 2007

(54) NON-CONTACT SCANNING APPARATUS USING FREQUENCY RESPONSE SCHEME AND SCANNING METHOD THEREOF

(75) Inventors: Sung Q Lee, Daejon (KR); Ki Bong Song, Daejon (KR); Kang Ho Park, Daejon (KR); Jun Ho Kim, Gyeongsangnam-do (KR); Eun Kyoung Kim, Daejon (KR); Kyi Hwan Park, Gwangju (KR); Woo Sub Youm, Daejon (KR)

(73) Assignee: Electronics and Telecommunications Research Institute (KR)

( * ) Notice: Subject to any disclaimer, the term of this patent is extended or adjusted under 35 U.S.C. 154(b) by 52 days.

(21) Appl. No.: 10/651,680

(22) Filed: Aug. 28, 2003

(65) Prior Publication Data

US 2004/0094711 A1    May 20, 2004

(30) Foreign Application Priority Data

Nov. 14, 2002    (KR) .................. 10-2002-0070716

(51) Int. Cl.
  *G01B 5/28*    (2006.01)
  *G01N 13/16*   (2006.01)
(52) U.S. Cl. ....................................... 73/105
(58) Field of Classification Search ............. 73/105; 250/306

See application file for complete search history.

(56) References Cited

U.S. PATENT DOCUMENTS

| 5,517,280 | A | * | 5/1996 | Quate .................. 355/71 |
| 5,598,327 | A | * | 1/1997 | Somerville et al. ......... 363/131 |
| 5,652,377 | A | * | 7/1997 | Yagi ........................ 73/105 |
| 5,666,190 | A | * | 9/1997 | Quate et al. .................. 355/71 |
| 5,955,660 | A |   | 9/1999 | Honma |
| 6,005,246 | A | * | 12/1999 | Kitamura et al. .............. 73/105 |
| 6,094,971 | A |   | 8/2000 | Edwards et al. |
| 6,094,972 | A | * | 8/2000 | Yasutake et al. .............. 73/105 |
| 6,189,374 | B1 | * | 2/2001 | Adderton et al. ............. 73/105 |

OTHER PUBLICATIONS

J. Thaysen et al., "Atomic Force Microscopy Probe . . . Wheatstone Bridge Arrangement", Sensors and Actuators 83(2000) (pp. 47-53).
Masami Kageshima et al., "Noncontat Atomic Force Microscopy . . . And Carbon Nanotube Probe", Applied Surface Science 188 (2002) (pp. 440-444).
Shunji Watanabe et al., "Micro-fabricated Piezoelectric Cantilever For Atomic Force Microscopy"Rev.Sci.Instrum. 67(11), Nov. 1996, American Inst. of Physics (pp. 3898-3903).
Sung-Q Lee, et al., "Track/Focus Control . . . and Fast Data Transfer Rate Data Storage Device", ASPE 2002 Annual Meeting, vol. 27, pp. 176-181.
Sung-Q Lee, et a., "Non-contact Type AFM Using Frequency Separation Scheme", Abstract, pp. 375-378.

* cited by examiner

*Primary Examiner*—Daniel S. Larkin
(74) *Attorney, Agent, or Firm*—Blakely Sokoloff Taylor & Zafman

(57) ABSTRACT

An apparatus capable of tracking a sample surface level in a z direction and oscillating a cantilever at resonant frequency by using a frequency separation scheme in non-contact mode and method thereof. The inventive apparatus includes a sensing unit for sensing a sample surface; a frequency transforming unit for transforming the sensed signal; a frequency combining unit for combining signals; and an actuating unit for actuating the sensing unit.

12 Claims, 11 Drawing Sheets

NON-CONTACT SCANNING APPARATUS USING FREQUENCY RESPONSE SCHEME AND SCANNING METHOD THEREOF

FIELD OF THE INVENTION

The present invention relates to a non-contact scanning apparatus and a method for non-contact scanning; and more particularly, to a non-contact scanning apparatus capable of simultaneously tracking a sample surface and oscillating a sensor mounted at a distal end of an actuator in an atomic force microscope (AFM) and similar type of microscope using a single actuator through the use of a frequency response separation scheme in a non-contact mode.

DESCRIPTION OF RELATED ARTS

There are two types of scanning probe microscopy (SPM) for measuring sample surface characteristics. One is a contact mode wherein a tip contacts a sample surface and the other is a non-contact mode wherein a tip does not contact a sample surface.

As for the non-contact mode, a cantilever tip must be oscillated with a resonant frequency and mostly a piezoelectric (PZT) scanner is used to make a movement of the sample in x-y-z directions by using a voltage from piezoelectric material which has a broad frequency range.

Particularly, in case of controlling the gap between a tip and a sample according to an optical method, two actuators are necessary, one for oscillating a cantilever and the other for moving a cantilever in a vertical direction with respect to the surface of sample so as to keep a consistent space between the probe and the surface of sample. In case of not using an optical method, a tuning fork to which an optical fiber or a carbon nano tube is attached is used for measuring oscillation. Also, for the non-contact mode, a sensor-doped or fabricated cantilever can be used, or an additional actuator can be used to oscillate the cantilever.

Prior arts related to this field will be described in the following.

[Prior Art 1]

A method for measuring a displacement at a distal end of a cantilever using a laser diode (LD) and a photo diode (PD) is the most broadly known method in SPM field. Although it is difficult to align the LD and the PD, those LD and PD can be aligned easily with use of a well-developed method in this field.

However, if a displacement arises in a large extent at a fixed part of the cantilever, an oscillation range of the cantilever gets sufficiently small because of deflected optical alignment. Because of this problem, an actuator for oscillating the cantilever at a resonant frequency and an actuator for controlling a tip/sample gap in a vertical direction cannot be used together. A signal from the PD is signal-processed in a lock-in amplifier. The signal processing in a lock-in amplifier is disclosed in U.S. Pat. No. 5,955,660 entitled "Method of controlling probe microscope."

[Prior Art 2]

Another method for measuring a tip/sample gap in non-contact mode employs a tuning-fork. An optical fiber for a near field scanning optical microscope (NSOM) or a carbon nano tube for an atomic force microscope (AFM) is attached to a tuning-fork. In these two methods, the tuning-fork measures variation of an amplitude of oscillation in a form of electrical or optical signals as the tip/sample gap varies.

However, attachment of the optical fiber or carbon nanotube onto the tuning-fork is very difficult, and sensitivity varies with every attachment.

Also, an additional actuator for controlling a cantilever in a Z direction is necessary because the tuning-fork is solely used for sensing the tip/sample gap. A XYZ Scanner is usually used as the additional actuator, which is disclosed in an article by Masami Kageshima and et al., "Non-contact atomic force microscopy in liquid environment with quartz tuning fork and carbon nanotube probe", Applied Surface Science, 7695, 2002, pp 1–5, and U.S. Pat. No. 6,094,971 entitled "Scanning-probe microscope including non-optical means for detecting normal tip-sample interactions."

[Prior Art 3]

To solve the problem of difficulty in optical alignment of SPM, a cantilever with a sensor is broadly used, wherein the cantilever on which a Piezo-resistive material is doped or fabricated. This case is advantageous that a sensor mounted cantilever can be attached to the actuator moving in the Z direction. However, a sensor mounted cantilever in non-contact mode in as shown in the Prior art 1 should have one actuator for oscillating the cantilever with a resonant frequency and another actuator for driving the cantilever in the Z direction of a sample surface. If the difficulty of optimal alignment is negligible, this method can be used for measuring sample surface topography and characteristics. Although an optical method has a better sensitivity, resolution of the sample surface topography is low. However, there is not much difference in sensitivity when using a lock-in amplifier in non-contact mode, which is disclosed in an article by J. Thaysen et al., "Atomic force microscopy probe with piezoresistive read-out and a highly symmetrical Wheatstone bridge arrangement", Sensor and Actuators 83, 2000, pp 47–53.

[Prior Art 4]

One step further of the cantilever with the sensor is a cantilever with a sensor and an actuator, each element being fabricated and incorporated with each other in one-step process. There are several advantages on the cantilever designed at its own resonant frequency, and another advantage is that the function of sensing and actuating is realized in single sensor/actuator cantilever.

However, when fabricating these cantilevers, a trade off between the design for high resonant frequency and the design for large actuating range exists. The general actuating range of the prior art was around 1 µm. Even though this level of actuating range can be used in a certain sample surface, the general sample surface needs actuating range of about 10 µm.

Therefore, in the prior art 4, an additional actuator for controlling a cantilever in a Z direction of a sample surface is necessary for a practical implementation, which is disclosed in an article by Shunji Watanabe and Toru Fujii, "Micro-fabricated piezoelectric cantilever for atomic force microscopy", Rev, Sci. Instrum. 67(11), 1996, pp 3898–3903.

SUMMARY OF THE INVENTION

It is, therefore, an object of the present invention to provide an apparatus and method for tracking a sample surface level with a single actuator while not using an additional actuator for driving a cantilever in a Z direction and for oscillating a cantilever at its own resonant frequency in a non-contact mode by using a frequency response separation scheme.

In accordance with an aspect of the present invention, there is provided an apparatus for measuring in non-contact mode including a sensing unit for sensing through the amplitude variation of the sensor's resonant frequency keeping a distance from the sample which is moving in the X and Y directions; a frequency transforming unit for transforming the measured signal in the sensing unit to the first signal in the form of frequency; a frequency combining unit for combining the first signal and the second signal from the function generator, wherein the second signal is identical to the resonant signal and higher frequency compared to the first signal; and actuating unit for actuating the sensing unit responding to the first signal which is a low frequency compared to the second signal and providing the combined signal to sensing unit to actuate the sensing unit selectively in the second signal which is relatively high frequency compared to the first signal.

In accordance with another aspect of the present invention, there is also provided an apparatus for measuring by using a frequency response separation, including the steps of a) sensing through the amplitude variation of the sensor's resonant frequency keeping a distance from the sample which is moving in the X and Y directions; b) transforming the measured signal to the first signal in the form of frequency, wherein; c) combining the first signal and the second signal from the function generator, wherein the second signal is identical to the resonant signal and higher frequency compared to the first signal; d) transferring the combined signal by the feedback loop; and e) actuating the sensing unit responding to the first signal which is relatively low frequency compared to the second signal and executing the frequency response separation by providing the combined signal to sensing unit to actuate the sensing unit selectively in the second signal which is relatively high frequency compared to the first signal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Figure 1:
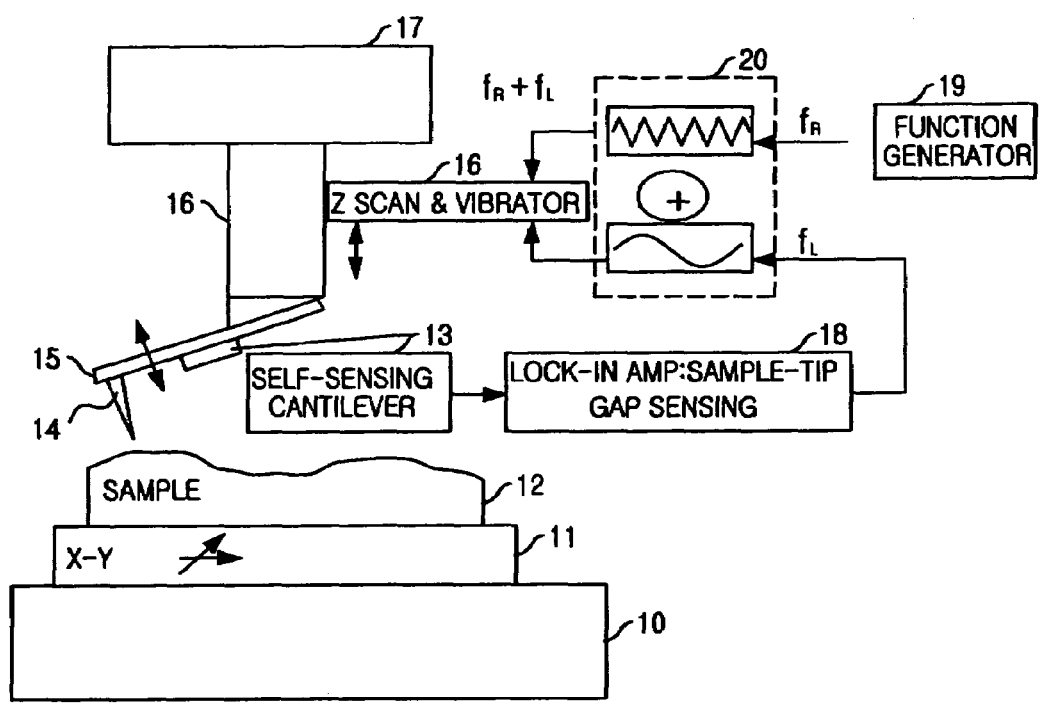
FIG. 1 is a schematic diagram showing a microscope, wherein a self-sensing cantilever and an actuator are combined in accordance with the present invention.

FIG. 1 is a diagram of an electronic microscope combined with a self-sensing cantilever and an actuator in accordance with the present invention.

Referring to FIG. 1, the electronic microscope includes an X-Y scanner 11 for scanning a sample surface in the direction of X and Y on a base unit 10. A sample 12 is located on the base unit to be measured by the X-Y scanner 11.

A cantilever 15 has a self-sensing unit over the sample 12 and a tip 14 mounted at a distal end of the cantilever 15 for sensing a sample surface. The cantilever 15 is supported by an actuator 16 which drives the cantilever 15 in a Z direction. The actuator 16 is supported by a fixed member 17.

The variation of a gap between the tip 14 and the sample 12 is compared to a resonant frequency, $f_R$ is a resonant frequency of the cantilever 15, and then a lock-in amplifier 18 calculates an actual distance between the tip 14 and the sample 12 and outputs a low frequency $f_L$ signal responding to the calculated distance between the tip 14 and the sample 12.

A function generator 19 outputs a resonant frequency $f_R$ for oscillating the cantilever. Herein, the outputted resonant frequency $f_R$ is greater than the above low frequency $f_L$, for example, $f_L=1$ kHz, $f_R=37$ KHz. A frequency combining unit 20 modulates the resonant frequency $f_R$ and the low frequency signal $f_L$ to drive the actuator 16 in the Z direction.

Subsequent operation procedure will be explained in detail below.

The frequency combining unit 20 outputs a combined signal $f_R+f_L$, which is, in turn applied to the actuator 16. Herein, the signal $f_R+f_L$ is a combined signal of the resonant frequency $f_R$ outputted from the function generator 19 for oscillating the cantilever 15 and the low frequency signal $f_L$ which is a surface profile of sample. The combined signal $f_R+f_L$ drives the actuator 16 with a voltage signal and driving force makes the movement of the cantilever 15 in the Z direction and oscillates the cantilever 15 with the resonant frequency $f_R$ simultaneously.

A magnitude of an oscillation signal, i.e., an amplitude of the signal varies with the gap between the tip 14 of cantilever 15 and the sample 12. Therefore, the variation of these amplitudes is measured by a self-sensing unit 13 which is attached to the cantilever 15 and then these variable amplitudes are calculated into a surface profile of the sample 12 in the lock-in amplifier 18.

The above measured signal is passed to a feedback loop which starts with measuring the sample surface profile in the lock-in amplifier 18 with use of the measured signal, which is in turn, used as a low frequency signal $f_L$ for driving the actuator 16 by being coupled to the actuator 16, and subsequently being coupled to the frequency combining unit 20.

Figure 2:
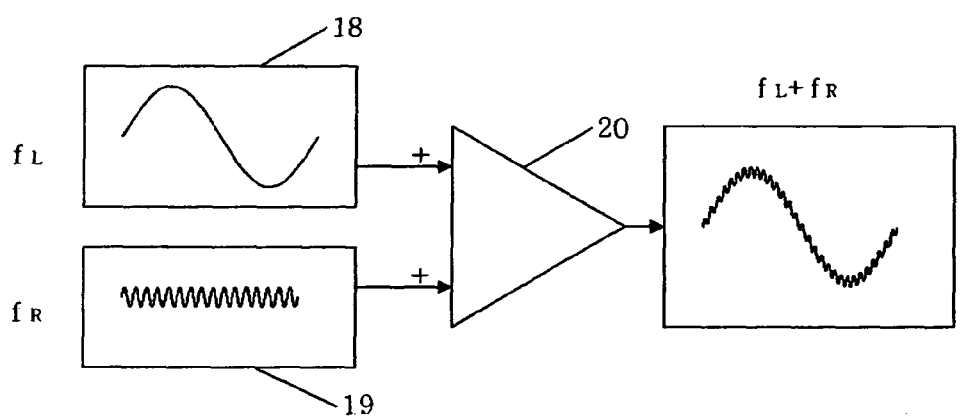
FIG. 2 is a block diagram showing a combining of two different input signals applied to the actuator in accordance with the present invention.

FIG. 2 is a block diagram showing a method for combining two different signals, which are a resonant frequency signal of the cantilever and a low frequency voltage signal responding to a surface profile of the sample 18.

In FIG. 2, the highest value and the lowest value of a voltage signal does not exceed the maximum voltage. Although a voltage of the resonant frequency is small, it is high enough to oscillate the cantilever 15.

Figure 3:
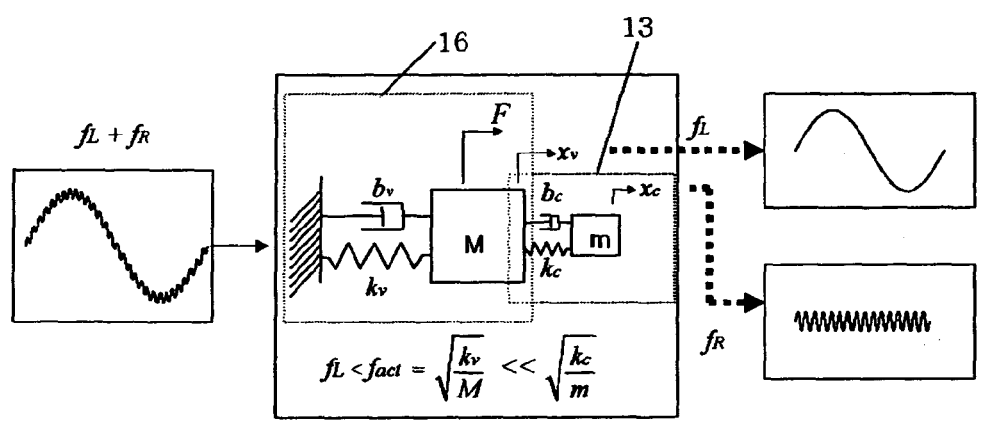
FIG. 3 is a block diagram showing a mathematical modeling of a system including a sensor and an actuator to explain how to separate a combined signal in the system.

FIG. 3 is a block diagram showing a frequency separation scheme based on a difference in frequency responses, particularly showing how a combined voltage signal from a frequency combining unit 20 is separated in a unit including the actuator 16 and the sensing unit 13.

In FIG. 3, the actuator 16 and the sensing unit 13 can be modeled in the structure of mass, i.e., M and m, spring, i.e., $K_v$ and $K_c$, and damper, i.e., $b_v$ and $b_c$.

The actuator 16 and the sensing unit 13 have a different frequency band sensitively responding to the combined signal.

The resonant frequency of the cantilever 15 is even higher than that of the actuator 16 and the actuator 16 functions same as a low pass filter. The actuator movement for a high frequency band is very small and the response to a low frequency voltage signal becomes about 1:1. In this manner, signals are separated by their frequency responses.

The frequency response of the actuator 16 responding to a high frequency band of these separated signals is very small and negligible because the cantilever 15 has a sufficiently big response to a high frequency signal.

Eq. 1 and Eq. 2 are dynamic equations which express the block diagram shown in FIG. 3.

$$Mx_v'' + b_v x_v' + k_v x_v + b_v(x_v' - x_c') + k_c(x_v - x_c) = F \quad [\text{Eq. 1}]$$

$$mx_c'' + b_c(x_c' - x_v') + k_c(x_c - x_v) = 0 \quad [\text{Eq. 2}]$$

M is a mass of the actuator 16, m is a mass of the sensing unit 13, $x_v$ is a displacement of the actuator 16, $x_v'$ is a first order derivative of $x_v$ and a velocity of the actuator 16, $x_v''$ is a second order derivative of $x_v$ and an acceleration of the actuator 16, $x_c$ a displacement of the sensing unit 13, $x_c'$ is a first order derivative of $x_c$ and $x_c'$ is a velocity of the sensing unit 13, $x_c''$ is a second derivative of $x_c$ and a acceleration of the sensing unit 13, $k_v$ is a spring constant of the actuator 16, $k_c$ is a spring constant of the sensing unit 13, $b_v$ is a damper constant of the actuator 16, $b_c$ is a damper constant of the sensing unit 13, and F is an applied force and a driving force which moves the actuator 16.

Therefore, Eq. 1 shows specific forces arisen by the applied force. The summation of the forces of a left hand side is equal to the applied force of a right hand side.

Specific forces expressed in the Eqs. 1 and 2 are explained in details below.

$Mx_v''$ is a multiple of the mass of the actuator 16 and the acceleration of the actuator 16 by the applied force F and physically shows that the actuator 16 is moving with a predetermined acceleration by the applied force. $b_v x_v'$ is a multiple of the damper constant $b_v$ and the velocity of the actuator 16. $k_v x_v$ is a multiple of the spring constant $k_v$ of the actuator 16 and the displacement $x_v$ of the actuator 16.

Also, $b_v(x_v' - x_c')$, the force with respect to the damper and $k_c(x_v - x_c)$, the force with respect to the spring characteristics, both are taking account of a relative displacement of the actuator $x_v$ against the displacement of the cantilever $x_c$.

Eq. 2 shows the cantilever motion accompanying the motion of the actuator 16 in Eq. 1.

The value of the right hand side is "0" because no force is applied to the cantilever 15. $mx_c''$ is a multiple of the mass m of the cantilever 15 and the acceleration $x_c''$ of the cantilever 15, and physically shows that the cantilever is moving with a predetermined acceleration by the applied force "0".

Also, $b_c(x_c' - x_v')$ the force with respect to the damper and $k_c(x_c - x_v)$, the force with respect to the spring characteristics, both are taking account of a relative displacement of the actuator $x_c$ against the displacement of the cantilever $x_v$.

Eqs. 3 to 5 show a ratio of the displacement by the applied force with the Laplace transform of Eqs. 1 and 2.

$$\frac{x_v(s)}{F(s)} = \frac{ms^2 + b_c s + k_c}{mMs^2 + (Mb_c + m(b_c + b_v))s^3 + (Mk_c + b_v b_c + m(k_c + k_v))s^2 + (b_v + k_c)s + k_c k_v} \quad [\text{Eq. 3}]$$

$$\frac{x_c(s)}{F(s)} = \frac{b_c s + k_c}{mMs^2 + (Mb_c + m(b_c + b_v))s^3 + (Mk_c + b_v b_c + m(k_c + k_v))s^2 + (b_v + k_c)s + k_c k_v} \quad [\text{Eq. 4}]$$

$$\frac{x_v(s) - x_c(s)}{x_v(s)} = \frac{ms^2}{ms^2 + b_c(s) + k_c} \quad [\text{Eq. 5}]$$

Eq. 3 shows the ratio of the displacement $x_v$ of the actuator 16 by the applied force F, and Eq. 4 shows the ratio of the displacement $x_c$ of the cantilever 15 by the applied force F. Eq. 5 shows the ratio of the displacement $x_c$ of the cantilever 15 by the relative displacement $(x_c - x_v)$.

Figure 4A:
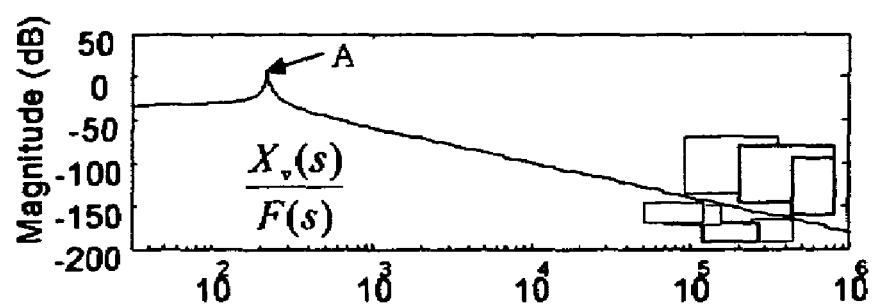
FIGS. 4A to 4C are graphs showing mathematical analysis results with respect to a frequency response of an actuator and a sensor.
Figure 4B:
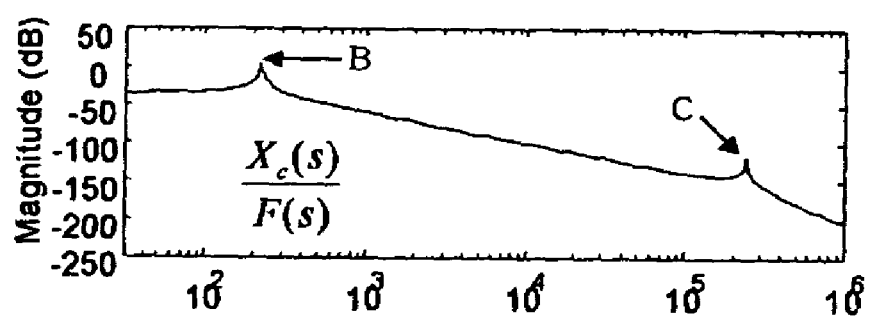
Figure 4C:
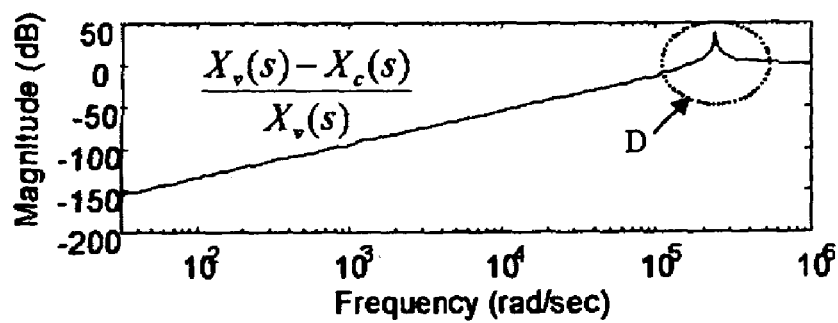

FIGS. 4A to 4C are graphs showing a mathematical analysis of the frequency response of the actuator 16 and the self-sensing cantilever 15. Eqs. 3 to 5 show different frequency responses in view of the mathematical modeling of FIG. 3, and the representations are shown in FIGS. 4A to 4C.

Referring to FIGS. 4A to 4C, a voltage is applied to the actuator 16. The actuator 16 subsequently produces a force F which results a displacement of the actuator 16 and also oscillates the cantilever 15.

FIG. 4A shows that the displacement of the actuator 16 has a small response at a resonant frequency $f_R$ of cantilever 15, which is a high frequency and has a large response at a low frequency $f_L$ which is about $10^2$ Hz as described as 'A'.

FIG. 4B shows that the displacement of the cantilever 15 also has a peak value at the low frequency $f_L$, which is about $10^2$ Hz and a high frequency, which is about $10^5$ Hz.

'B' and 'C' in FIG. 4B show that there are two resonant frequencies.

Consequently, the relative displacement of the cantilever 15 by the actuator 16 has the highest frequency response at a high frequency signal, which is about $10^5$ Hz. In actual operation, a self-sensing unit 13 can work only when a relative displacement in FIG. 4C arises, and thus, it senses such relative displacement shown in FIG. 4C.

As shown in FIG. 4C, the sensing unit 13 most highly responds to the resonant frequency. Using this characteristic, a voltage signal at the resonant frequency of the sensing unit 13 is added to a sample surface profile signal.

Figure 5:
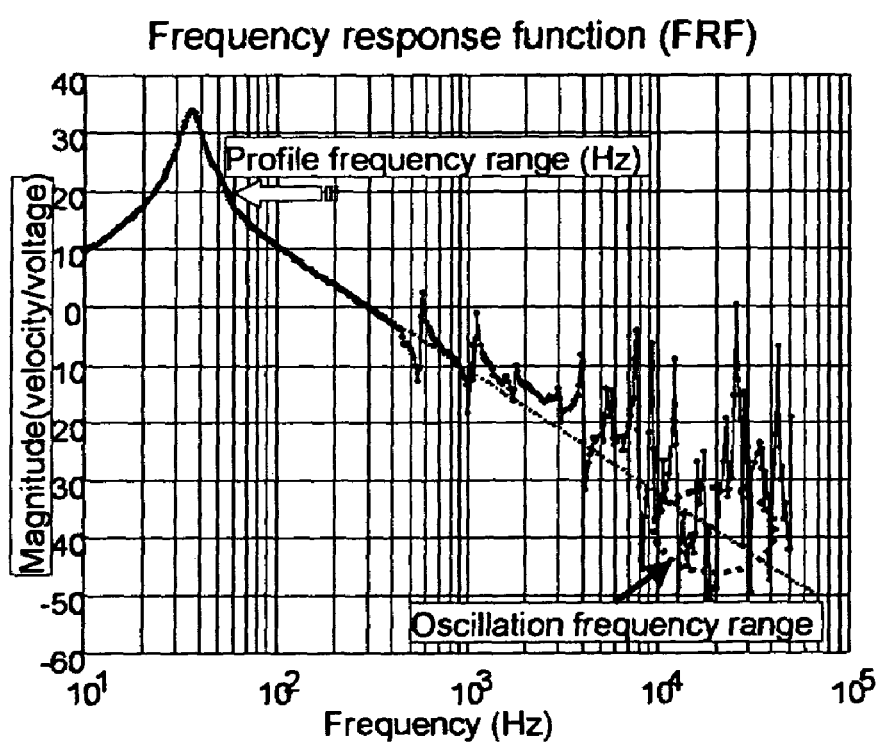
FIG. 5 is a graph showing a result of an experiment in frequency responses of an actuator.

FIG. 5 is a graph showing a result of an experiment in frequency responses of the actuator 16, which is a voice coil motor (VCM).

Figure 6:
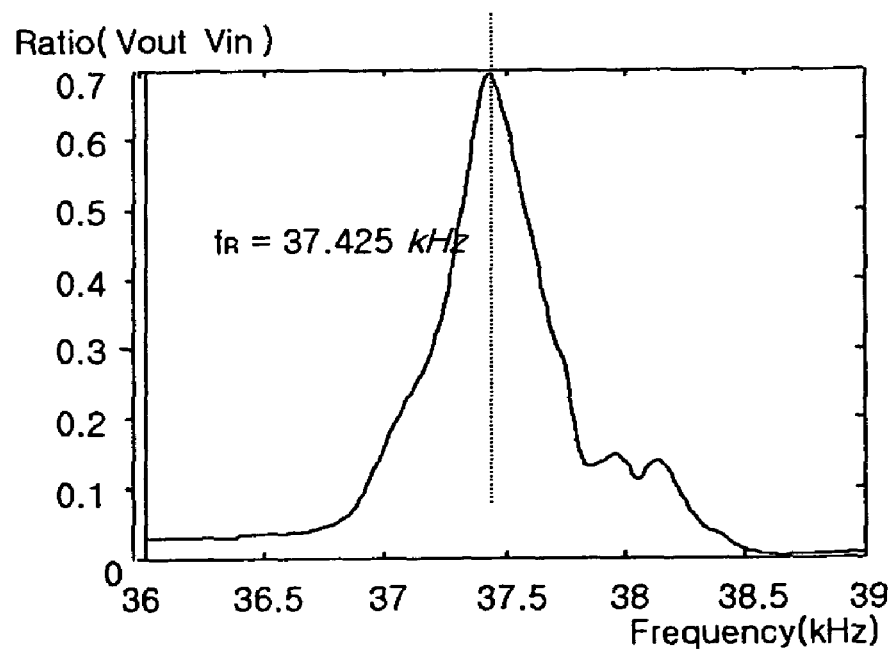
FIG. 6 is a graph showing a result of an experiment in frequency responses of a sensor.

FIG. 6 is a graph showing a result of an experiment in frequency response of the sensing unit 13.

In FIG. 5, the actuator 16 has a peak value between about 10 Hz and about 100 Hz, which is similar to the result 'A', i.e., profile frequency range as shown in FIG. 4A. The result has a weak response in a range of frequency around $10^3$ Hz~$10^5$ Hz, i.e., Oscillation frequency range.

FIG. 6 shows that sensing unit 13 has the highest input to output ratio at the resonant frequency $f_R$, which is about 37.425 Hz.

As shown in FIGS. 5 and 6, the VCM has a high response at a low frequency, but a low response at the resonant frequency of the cantilever, which is a high frequency. This shows that a mechanical system is functioning as a low pass filter.

The actuator 16 has several oscillation regions at a high frequency because of its several frequency modes, but basically those responses become smaller. The cantilever 15 has high sensitivity at the resonant frequency. This sensitive response helps the sensitive sensing of the tip-sample gap.

Figure 7:
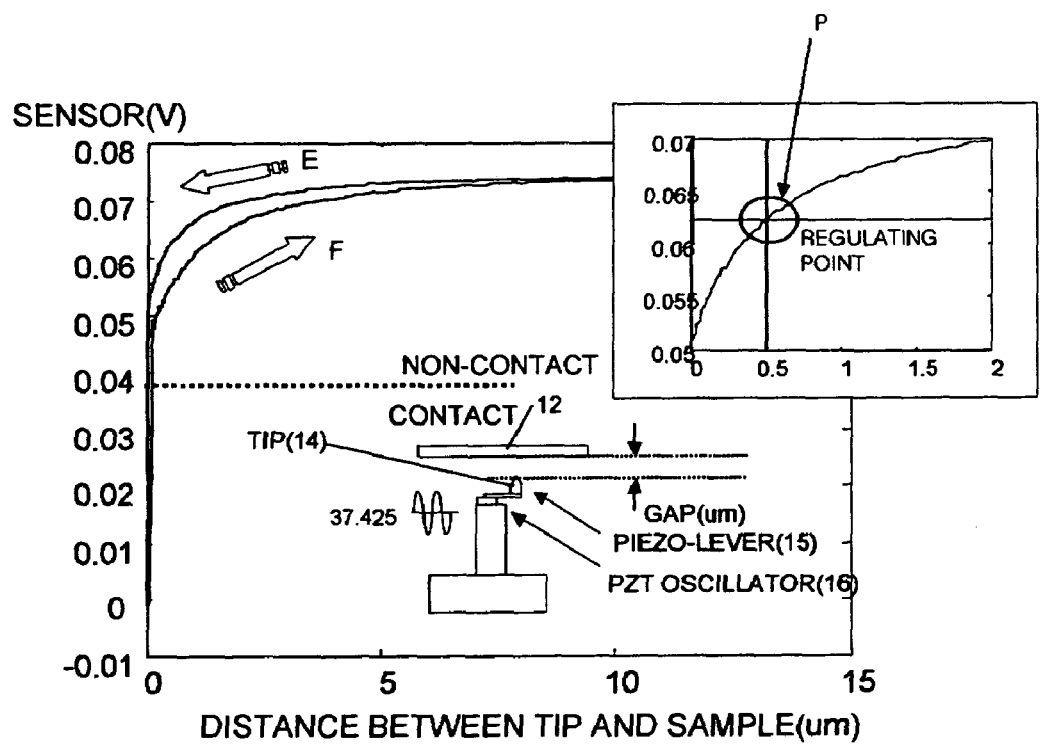
FIG. 7 is a graph showing an amplitude variation of the cantilever by a tip/sample gap and a gap setting for sensing a sample surface.

FIG. 7 is a graph showing an amplitude variation of the cantilever 15 due to the tip-sample gap measured in μm and a sensing gap setting for measuring a sample surface. The cantilever tip closes to the sample surface and a sensor voltage which is produced from cantilever amplitude information, is measured.

'E' in FIG. 7 shows that the amplitude of the cantilever 15 and a sensor voltage decrease when the cantilever tip 14 closes to the sample 12. The decreasing sensor voltage abruptly changes in proportion to the tip-sample gap. As a result, a feedback control sets the point at which the value is suddenly changing and the tip-sample gap can stay near to the controlled point. In this manner, the tip-sample gap can be controlled within a range of regulating the point 'P'.

Figure 8:
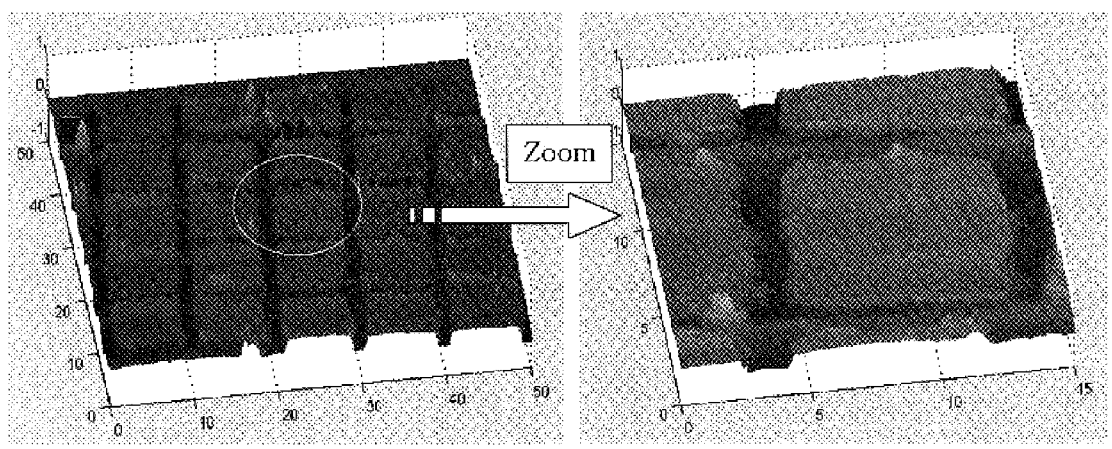
FIG. 8 is a graph showing a result of measuring a sample surface of about 10 μm square lattice in non-contact mode.

FIG. 8 is a graph showing results of measuring a sample surface of about 10 μm square lattice in non-contact mode. The sample of the 10 μm square lattice with the feedback control from the FIG. 7 was measured with 50 μm$^2$ and 15 μm$^2$ through the use of the non-contact scanning apparatus.

As shown in FIG. 8, the present invention allows a high resolution imaging of the sample 12 and the frequency response separation scheme improves the performance.

Figure 9:
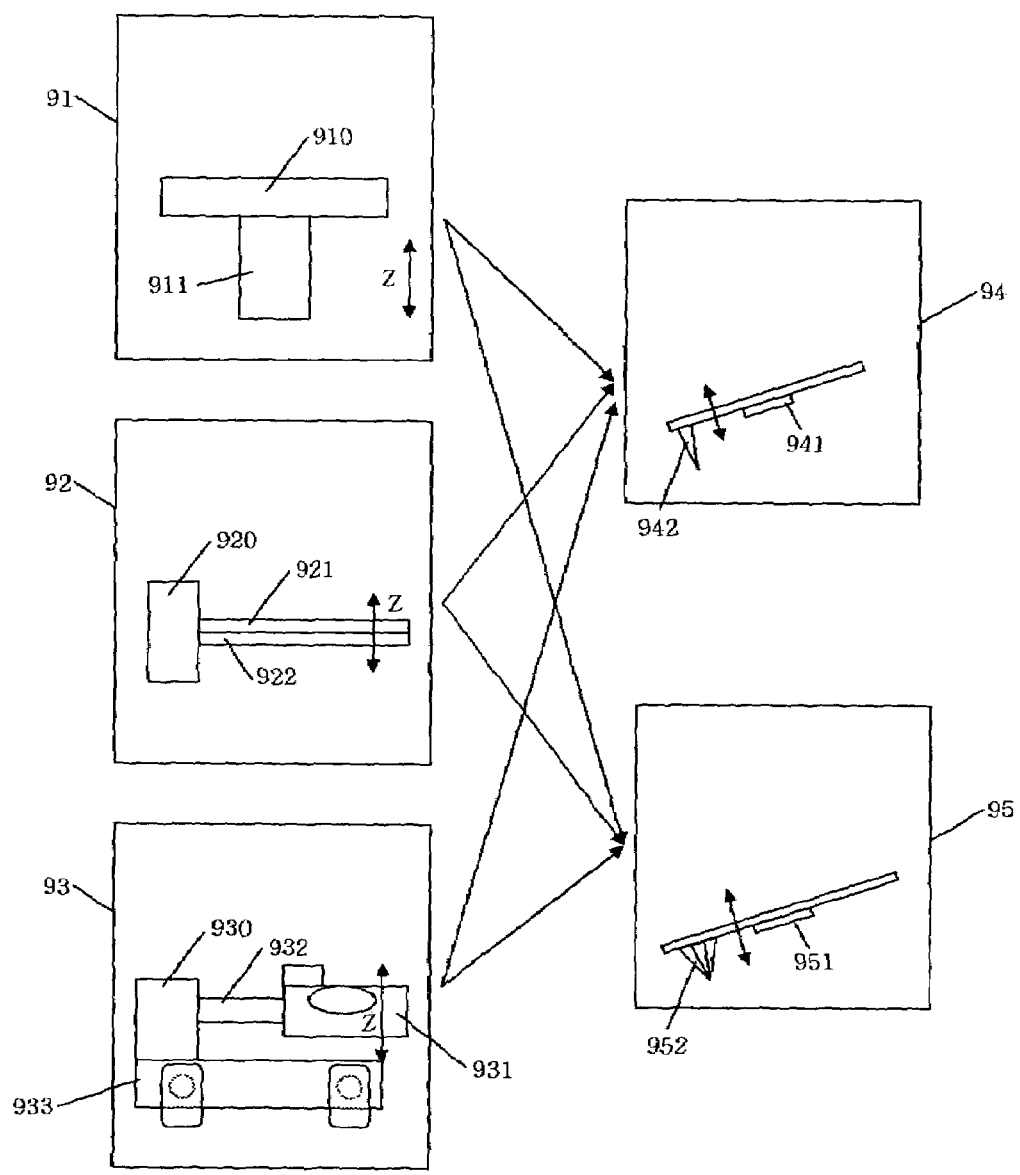
FIG. 9 is a block diagram showing combinations to which a frequency separation scheme can be applied in accordance with the present invention.

FIG. 9 is a block diagram showing possible combinations to which the frequency separation scheme can be applied in accordance with the present invention.

FIG. 9 shows exemplary actuators; they are a piezo actuator 91, a Bimorph actuator 92 and a VCM 93.

The piezo actuator 91 includes a fixed member 910 and an actuator which is attached to the fixed member 910 and driven in a Z direction.

The bimorph actuator 92 is driven in a Z direction through which a fixed member 920 is connected to one end of the bimorph actuator 92 including two metal having different electrical and thermal characteristics and being contacted to each other.

The VCM 93 includes a base 933, a supporting member 930, a connecting member 932 and an actuator 931, and is driven in a Z direction.

The piezo actuator 91, the bimorph actuator 92 and the VCM 93 have common characteristics of an actuating range exceeding height of the sample surface. Because of this characteristic, even though a response displacement is small in a high frequency range, these actuators reach the sample surface.

The cantilever has self-sensing units 941 and 951 which have either a tip 942 or a tip with an aperture 952. AFM topography measurement is allowed for the tip 942 and NSOM is allowed for the tip with an aperture 952.

Figure 10:
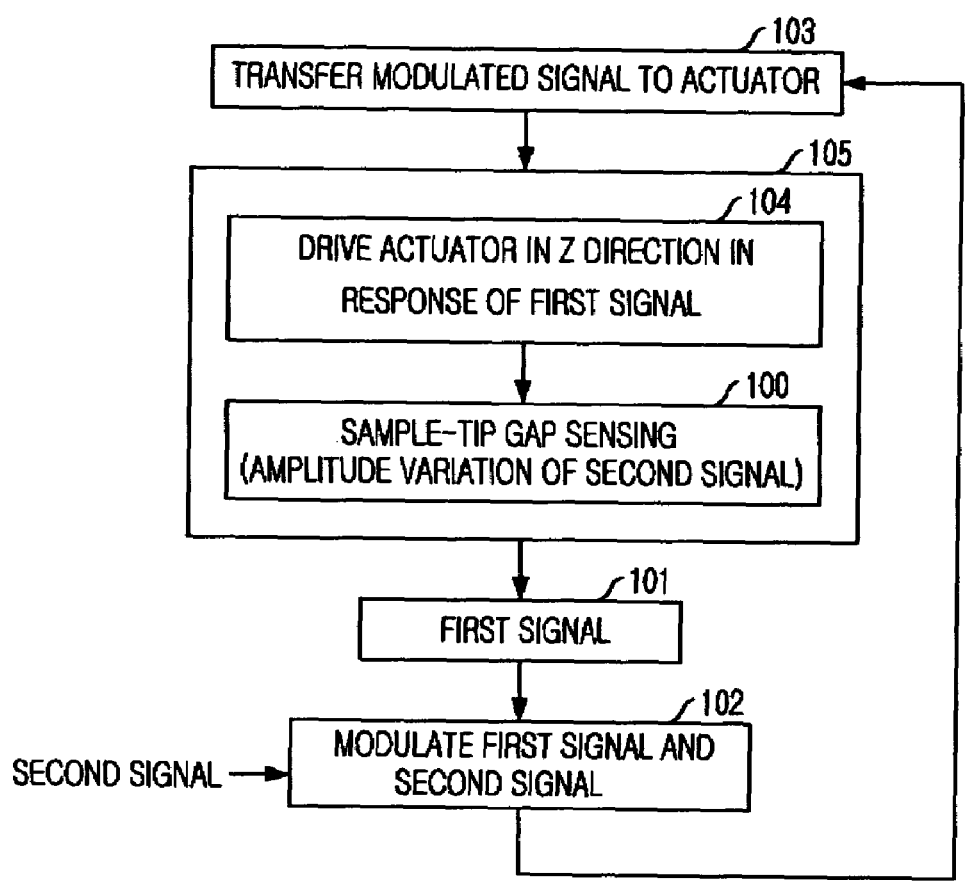
FIG. 10 is a flowchart showing a method of measuring a sample surface by using a frequency separation scheme in accordance with the present invention.

FIG. 10 is a flowchart describing a method of non-contact surface measurement with use of the frequency separation scheme in accordance with the present invention.

In FIG. 10, at step 100, keeping a uniform distance from the sample, sample surface topography is measured with the amplitude variation of the resonant frequency.

At step 101, the measured signal is transformed into a first signal which is a frequency signal. The first signal is an analog signal which is transformed from the tip-sample gap of a second signal.

At step 102, the first signal is combined with the second signal by a function generator. The second signal is the resonant frequency which is a higher frequency than the first signal.

At step 103, the combined signal is transferred to the actuator through the feedback loop. At step 104, the actuator is driven responding to the first signal of the combined signal, which is a low frequency compared to the second signal of the combined signal. At step 105, the sensing unit is driven by the second signal which is relatively a high frequency compared to the first signal. The frequency separation is then executed.

Using the frequency separation scheme which can be applied to the AFM and the NSOM, one actuator can track the height of the sample surface and oscillate the cantilever with the resonant frequency. Therefore, the present invention can simplify the apparatus structure and minimize the number of actuators. According to this simplification of the structure and the actuator amplification, there are great advantages in aspects of the price and the structure.

Because of the simple structure, the present invention can be used not only in the AFM but also in the NSOM, which measures optical and topographical information, an alpha step, which measures a step height of the surfaces, and a gap control system between a pick-up head and a sample, which is necessary to record and play optical information in aperture-type tip high density data storage apparatus.

While the present invention has been described with respect to certain preferred embodiments, it will be apparent to those skilled in the art that various changes and modifications may be made without departing from the scope of the invention as defined in the following claims.

What is claimed is:

1. An apparatus comprising:
   a sensing means for sensing the sample surface based on an amplitude variation in a resonant frequency of the sensing means by keeping a uniform distance from the sample which is moving in X and Y directions;
   a frequency transforming means for transforming the sensed by the sensing means to a first signal in the form of a frequency;
   a frequency combining means for combining the first signal and a second signal outputted from a frequency generator to generate a combined signal, wherein the second signal is identical to the resonant frequency and is a higher frequency compared to the first signal; and
   a single actuator for actuating the sensing means in response to the first signal which is a lower frequency compared to the second signal and providing the combined signal to the sensing means to actuate the sensing means selectively at the second signal, the single actuator to oscillate a cantilever coupled to the single actuator with the second signal that is separated from the combined signal,
   wherein the apparatus scans the sample surface in a non-contact mode, and the single actuator functions as a low pass filter by responding to the first signal.

2. The apparatus as recited in claim 1, wherein the sensing means measures amplitude variation of the resonant frequency which is proportional to a displacement of a gap in the sample surface, while the sensing means are keeping a uniform distance from the sample through the use of the actuating means which is driven in a Z direction responding to the first signal.

3. The apparatus as recited in claim 1, wherein the sensing means includes:
   a tip which is mounted at a distal end of the cantilever for tracking the sample surface; and
   a sensing unit which is attached to a predetermined area of the cantilever for sensing the sample surface.

4. The apparatus as recited in claim 3, wherein the tip has a probe and is used as an atomic force microscope.

5. The apparatus in recited as claim 3, wherein the tip has an aperture and is used as a near field scanning optical microscope.

6. The apparatus as recited in claim 1, wherein the sample is moving in the X and Y directions by an X-Y scanner disposed under the sample.

7. The apparatus as recited in claim 1, wherein the single actuator is one selected among a piezo actuator, a bimorph actuator, and a voice coil motor.

8. A method comprising:
   a) sensing the sample surface based on an amplitude variation of a resonant frequency of a sensing means by keeping a uniform distance from the sample which is moving in X and Y directions;
   b) transforming the sensed signal to a first signal in a form of frequency;
   c) combining the first signal and a second signal outputted from a frequency generator to generate combined signal, wherein the second signal is identical to the resonant signal and is a higher frequency compared to the first signal;
   d) transferring the combined signal to a single actuator through a feedback loop; and
   e) actuating a cantilever in the sensing means in response to the first signal which is a lower frequency compared to the second signal and executing the frequency response separation by providing the combined signal to the sensing means to actuate the sensing means selectively at the second signal, wherein actuating the cantilever functions as a low pass filter by responding to the first signal.

9. An apparatus comprising:
   a sensing means for sensing a sample surface based on an amplitude variation in a resonant frequency of the sensing means by keeping a uniform distance from the sample which is moving in X and Y directions;
   a frequency transforming means for transforming the sensed signal in the sensing means to a first signal in the form of frequency;
   a frequency combining means for combining the first signal and a second signal outputted from a frequency generator to generate a combined signal, wherein the second signal is identical to the resonant frequency and is a higher frequency compared to the first signal; and
   a single actuator for actuating the sensing means in response to the first signal which is a lower frequency compared to the second signal and providing the combined signal to the sensing means to actuate the sensing means selectively at the second signal, the single actuator to oscillate a cantilever coupled to the single actuator with the second signal that is separated from the combined signal, wherein
   wherein the apparatus scans the sample surface in a non-contact mode, and the sensing means includes:
   a tip which is mounted at a distal end of the cantilever for tracking the sample surface; and
   a sensing unit which is attached to a predetermined area of the cantilever for sensing the sample surface.

10. The apparatus as recited in claim 9, wherein the sensing means measures amplitude variation of the resonant frequency which is proportional to a displacement of a gap from the sample, while the sensing means are keeping a uniform distance from the sample through the use of the actuating means which is driven in a Z direction responding to the first signal.

11. The apparatus as recited in claim 9, wherein the sample is moving in the X and Y directions by a X-Y scanner disposed under the sample.

12. The apparatus as recited in claim 9, wherein the single actuator is one selected among a piezo actuator, a bimorph actuator, and a voice coil motor.

* * * * *